Aug. 13, 1968

L. BALAMUTH 3,396,892

ULTRASONIC MOTOR SYSTEM

Filed Jan. 20, 1966

INVENTOR.
LEWIS BALAMUTH

BY

*Leonard W. Suroff*

ATTORNEY

United States Patent Office 3,396,892
Patented Aug. 13, 1968

3,396,892
ULTRASONIC MOTOR SYSTEM
Lewis Balamuth, New York, N.Y., assignor to Cavitron Corporation, a corporation of New York
Filed Jan. 20, 1966, Ser. No. 521,949
14 Claims. (Cl. 228—1)

This invention relates generally to the art of employing potential energy generated in vibratory systems, which systems may be utilized in performing various operations, for example, forging, dimpling, drawing, extruding, swaging and forming of metals, in the welding of plastic or metals, to mention but a few of the present applications of vibratory systems, and it is particularly directed to employing the elastic strain energy at substantially a displacement nodal region of vibratory motion.

Heretofore, when using a vibrator or ultrasonic motor in vibratory systems in the aforementioned applications the motor is generally applied under a static force to engage a work object or surface and the various types of elastic modes of vibration are exploited, such as compressional, flexural, torsional, shear, and radial waves or vibrations, etc. But, in all cases the effects sought are as a result of applying mechanical vibrations from the ultrasonic motor into the workpiece. This is inherent in the prevailing conception of a vibratory system that is engineered so as to apply its desired output vibrations through transmission means into some workpiece. In general, when a vibrator is vibrating in a state of resonant standing wave vibrations, the output surface of the transmission means (before application to the work) is free and is a displacement loop of standing wave vibrations. These vibratory systems are designed to be applied in applications wherein this output or contacting surface which engages the work object under a static load continues to vibrate and which vibrations are not damped out, during the operation thereof. In this manner high frequency mechanical vibrations in the form of impacts are continuously applied to the work object to perform any one of the numerous operations known in the art. It is at this output surface that the average kinetic energy of the vibratory system is greatest and which form of energy is coupled to the workpiece.

However, it has now been found that the displacement nodal region or plane of a vibration which offers a tremendous amount of elastic strain energy may be integrated with the work object whereby this generally potential energy may be harnessed to perform useful work and carry out the operations heretofore practiced by the vibratory output surface of the ultrasonic motor system.

This invention may be usefully applied to the above mentioned operations and more particularly is applicable to those operations where it is desirable and advantageous that a larger quantity or concentration of energy be transferred into the work object or piece. A number of the applications of high frequency vibrations which have been proposed and practiced have been handicapped, although technically feasible, by the inability to transfer sufficient quantities of energy at the work site. For example, although there has been a growing use of sonic and ultrasonic energy for forging, forming and dimpling operations, and the results to date clearly indicate that it is possible to replace extremely low frequency (60 cycle/second) motor working systems, with relatively smaller structures when using higher frequency vibratory systems, these vibratory systems, for certain applications are still limited in their delivery power of energy at the work site. Accordingly, it is an object of this invention to retain the various beneficial effects by the utilization of a form of mechanical energy, but rather than kinetic energy, as found at a displacement loop of vibratory motion, potential or essentially strain energy is employed which is available in the displacement nodal region of the transmission member or tool.

The theory of the invention may be more easily understood by considering the energy transmission means of the vibratory assembly, which is generally in the form of a working tool or transmission member as it relates to the concepts of potential and kinetic energy. In the present invention, we are concerned with the concept of applying an ultrasonic motor to processing applications wherein the cardinal, central idea is the utilization of the mechanical energy in the form of potential or strain energy of the vibrating motor rather than its kinetic energy. The kinetic energy of a standing wave system concentrates at a free end, while the potential, or strain elastic energy, concentrates at the nodal region within the body of the motor. In other words, the potential energy concentrates where there is effectively no mechanical vibrational motion in the direction of vibration as will hereinafter be discussed in detail. Instead there is present a high density of elastic alternating high frequency strain energy.

It is precisely because this type of energy is extraordinarily effective in metal and material processing of all kinds that we are here considering a new and novel concept in ultrasonic motor design which will permit the exploitation of this kind of strain energy for useful purposes. In order to utilize the elastic strain energy, we must somehow find the way to introduce the work object into the region of peak potential energy, or, in other words, into a stress loop or nodal region. Normally, all stress loops or nodal regions in a vibrator are designed so that at no time does the alternating stress in such a region exceed the endurance limit of the motor material at the region. Otherwise, the vibratory motor will fail in practice by fatigue. But we proceed quite otherwise, in accordance with the present invention wherein the ultrasonic motor is designed so that it is actually separated (i.e., already fractured so to speak) at the desired stress loop working region. It will be evident at once that a vibratory motor system, so designed, cannot function at all at its design frequency for standing wave resonant vibrations, so long as the separated transmission members or parts are separate. In order to operate the motor system, it becomes desirable to join the two separated transmission members under a suitable static force large enough to permit transmission of the elastic wave energy through the joined sections.

Now, in order to utilize the ultrasonic motor system for job applications, one has only to introduce the workpiece or pieces between the separated energy transmission sections so that the transmission of elastic wave energy from one separate section of the motor system to the other will require that such energy must also traverse the work itself. In this way the work must undergo a high alternating stress energy treatment under a static stress bias with whatever results flow from such treatment. In the current state of the art alternating stress energy is introduced into work parts by means chiefly of impacts or vibrations imparted due to the kinetic energy of the motor, translated into mechanical vibration.

The ultrasonic motor system herein disclosed is not limited to any particular type or mode of standing wave vibration of a body, nor is it limited to pure standing waves. It requires only that there is a finite standing wave ratio for the mode of resonant vibration for which the motor has been designed.

It is accordingly one of the primary objects of the present invention to provide a novel apparatus for introducing energy at a predetermined level to a workpiece particularly suited to various applications.

Another object is to utilize the elastic energy at a displacement node in a vibratory transmission member for performing various operations.

Another object is to provide a novel apparatus in a vibratory system for coupling a work object to the transmission member in substantially a displacement nodal region.

Yet another object of this invention is to provide a novel ultrasonic motor designed to operate at a resonant frequency when its output surface is pressed against a work object, so that the output surface is in a displacement nodal region.

Still another object of the present invention is to provide a novel apparatus by which a work object may be clamped between a pair of resonant transmission members separable at a nodal displacement region and coupled to at least one ultrasonic motor for imparting vibratory energy thereto.

These and other objects of the invention are accomplished by providing, as in one embodiment of this invention, an ultrasonic motor which is comprised of an electromechanical transducer means coupled to an energy transmission means which is vibrated at sonic or ultrasonic frequencies and its end or output surface is pressed against the work object or piece to permit a transfer of elastic strain energy to the latter. Support means in the form of a resonant anvil may be provided on the opposite side of the work piece whereby the output surface of said transmission means becomes a displacement node at substantially the area of engagement with the workpiece. For those applications wherein the thickness of the workpiece is substantially resonant with or of a relatively very large mechanical impedance then the characteristics of the support means are not as critical.

The device or motors used to power the selected transmission means essentially comprise a vibrator having an electromechanical part or section which is induced to vibrate at relatively high frequency and small amplitude by the feeding thereto of an energizing current from a suitable source, for example, an alternating current generator. The electromechanical section or part may be any one of several types such as electrodynamic, piezo-electric, or magnetostrictive, for example, with an operating frequency range in the order of 30 to 1,000,000 cycles per second, but preferably in the range of 400 to 100,000 cycles per second.

Where the electromechanical section or part is magnetostrictive, it is in the form of a stack surrounded by an energizing coil and having one end fixed to a connecting body whose other end rigidly supports a selected work tool. The connecting body may serve as an acoustic impedance transformer and be so shaped and formed as to either enlarge or reduce the amplitude of the vibrations produced in the magnetostrictive part as delivered to the transmission means or work tool through the connecting body. The vibrator above described, essentially is composed of an electromechanical part or section, a connecting body and transmission means which are rigidly joined end to end as a unit, and supported by a suitable housing or casing.

In another embodiment of the invention, the transmission means are in the from of a pair of separable transmission members with means for engaging the free ends together under sufficient force so as to comprise a single system when vibrating in the presence of that force. Spaced between said initially free ends of the members is a work object which for all practical purposes couples the two members together and although permitting the passage of vibratory energy therethrough is acted upon by the strain energy at this region which is in a general nodal displacement plane or an area close thereto.

In accordance with an aspect of the invention the separable transmission means are equal in length to integral number of quarter-wavelength transmission members and are urged toward each other by a static force with the work object to be worked upon positioned between the members, and acoustic or ultrasonic vibrations are transmitted to at least one of the transmission members by wave motion through a solid transmitting member or transformer, for example, at a frequency in the range between approximately 400 cycles per second and 100,000 cycles per second and the juncture between the members being positioned at substantially a nodal region of the waves passing through said pair of transmission members. It has been found that the combined action of the strain energy and of the applied static force makes it possible to weld, form, shape metals at room temperature, and further makes it possible to perform operations and avoid the defects of prior methods.

In accordance with another aspect of the invention, the vibratory energy is transmitted through an ultrasonic motor having an output section of substantially an integral odd number of one-quarter wavelengths and the frequency of vibration of said motor in an unloaded condition being off resonance as to the frequency of vibration for which the motor is designed and wherein the motor is brought into resonance when the output surface of the quarter wavelength tool is brought into engagement with the work object under a static load. In this manner the output section of the tool becomes a node of vibration.

An important aspect of the present invention is that the nodal region is established essentially at the location of the work object and towards this end of the physical length of the transmission members will take into consideration the thickness of the work object which might include a single thickness of metal as in a forming operation or two or more layers of plastic or metal in a welding operation. These thicknesses of the work objects will be calibrated and generally the quarter wavelength will be shortened an amount to permit this nodal region to remain in the immediate area of the workpiece. Thus, although the term "integral odd number of quarter-wavelengths" or "integral number of half-wavelengths" sections are used it is appreciated that the physical length of the transmission means will vary slightly to accomodate the thickness of the work object or contacting surfaces if the work object is composed of sheets of material. For the purposes of the present invention the term "ultrasonic" is intended to include frequencies from between approximately 30 to 1,000,000 cycles per second.

The word "node" as used herein is to be defined as the region of maximum stress for the particular vibration mode in which the energy transmission means is being vibrated. Thus, for example, if the transmission means is being longitudinally vibrated we will have a node of vibration in the longitudinal direction of vibration in which the longitudinal amplitude or stroke of vibration is essentially equal to zero, yet at this same node we have a loop of vibration for the transmission means in its radial mode and essentially a certain amount of lateral vibration therein.

Thus, the fact that other non-resonant modes of vibration are stimulated, through elastic coupling by the dominant design mode being employed to practice the invention, is not to be taken as altering in any substantial way the existence of the maximum stress nodal region of vibration just described. Clearly, our design may be such that the maximum stress nodal region of vibration may correspond to the type of vibration selected for use, namely compressional, radial, flexural, torsional, etc. vibrations.

As is generally theorized in the art of ultrasonic motor technology the underlying principles inherent in vibratory motors which employ the vibratory motion to perform useful work is the ability to substantially minimize the frictional resistance of the tool surface to relative movement with the work object. Contrary to this known principle of ultrasonic technology the present invention which employs elastic strain energy or potential energy is intent on clamping the work object to the matching members so that the work becomes a nodal region with a minimal of vibratory motion therein.

Although the work is generally situated at a nodal region the beneficial effects of obtaining a certain degree of vibratory motion at the work zone may still be desirable for certain applications wherein the combined effects of kinetic and potential energy characteristics are required. By designing the transmission member to be a given distance off the displacement nodal plane the separation of work and transmission output surface may be maintained or the same effect is obtainable by varying the nodal plane within the work object itself.

The above and other objects, features and advantages of the invention, will be apparent in the following detailed description of illustrative embodiments which is to be read in connection with the accompanying drawings forming a part hereof, and wherein.

Figure 1:
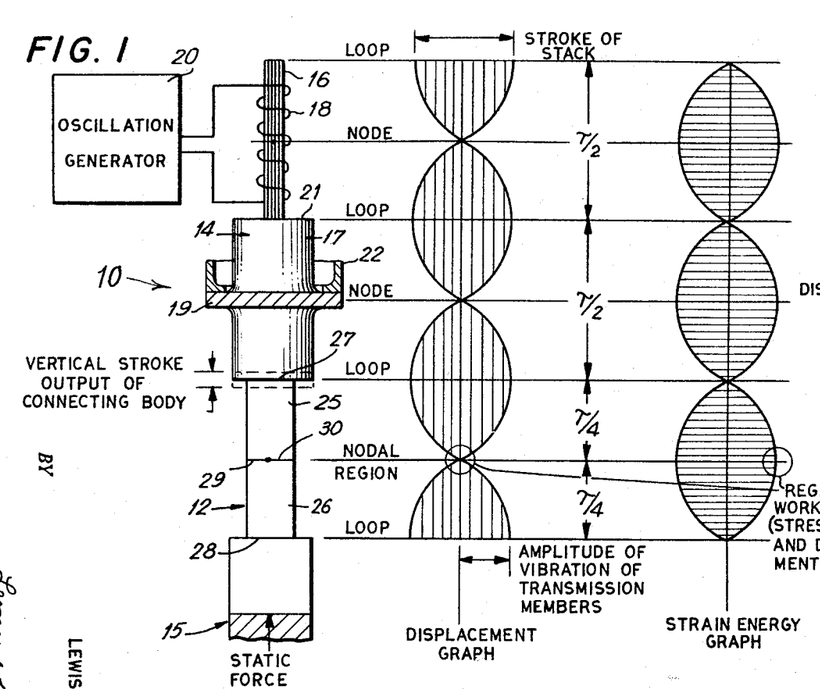
FIG. 1 is a schematic representation of the relationship between the component parts of a vibratory system designed to be separable at a nodal region of vibration embodying this invention and of the amplitude of vibration and the stress concentration at various points on the system.

Referring to the drawings in detail, wherein similar reference numerals refer to similar parts in the several views, it will be seen that FIG. 1 shows a vibratory system 10 comprised of energy transmission means 12 connected to a vibrator or transducer means 14 at one end and support means 15 at the opposite or lower end thereof.

The vibratory machine or transducer means 14, may be any one of a number of electromechanical types, such as, electrodynamic, piezo-electric or magnetostrictive, however, for purposes of discussing the present invention a transducer of the magnetostrictive type has been selected.

The transducer 14, is a vertically disposed, water-cooled magnetostrictive transducer, which is of the type generally disclosed in United States Letters Patent No. Re. 25,033, issued Aug. 29, 1961, to Lewis Balamuth and Arthur Kuris, and assigned to the present assignee. The transducer as diagrammatically shown, generally includes a driver unit made up of a generator 16, of mechanical vibrations and a connecting body which may form an acoustic impedance transformer 17. The generator 16 of mechanical vibrations may comprise a stack of laminations of magnetostrictive material, for example, nickel, and a diagrammatically illustrated winding 18, adapted to carry a biased, high frequency, alternating energizing current. The lower ends of the laminations making up the stack of vibration generator 16, are fixedly secured, as by welding or soldering to the upper end 21 of the connecting body 17, which has an enlarged section 19, intermediate at its ends, in the general area of a nodal plane of motion, for attachment to a suitable supporter casing 22.

A biased, high frequency alternating current at a predetermined frequency is supplied to winding 18, from a suitable oscillation generator 20. The oscillation generator is effective to supply a biased alternating current to the winding 18, at a resonant frequency of the driver unit of transducer 14, and is further effective to vary the frequency of the supplied biased, alternating current when the resonant frequency of the driver unit is varied due to changes in temperature, or changes in the loading thereof.

When transducer 14 is operated, by electrical oscillations supplied from generator 20, longitudinal compressional waves are generated in the stack of laminations 16, the body 17, and transmission means 12, generally comprised of a pair of separable transmission members or tools 25 and 26, so as to cause vibrational movements in the vertical direction, that is, along the longitudinal axis of the transducer. For the purposes of the present invention, such vibrations may have a frequency in the range between approximately 30 cycles per second and 1,000,000 cycles per second, but preferably from 400 to 100,000 cycles per second. In order to ensure that the maximum amplitude of vibration in the vertical direction is obtained at the input ends 27 and 28 of transmission members or tools 25 and 26, respectively, thus ensuring the maximum transmission of working energy, the overall length of the stack of magnetostrictive laminations 16 and the connecting body or transformer 17, that is, the driver unit of transducer 14, and of the vibration transmission means 12 is selected so that, at the frequency of the electrical oscillations supplied to winding 18 of the transducer, a loop of longitudinal motion of the generated compressional waves occurs at or near the input ends 27 and 28 with at least one nodal plane or region therebetween and at approximately this plane the transmission means 12 is separable into the two tool members 25 and 26 with output surfaces 29 and 30, respectively. In other words, the overall length of the driver unit of transducer 14 and transmission means 12 is approximately equal to an integral number of one-half wavelengths of the sound waves generated in the particular materials comprising the stack of laminations 16, the transformer 17 and the transmission means 12 at the resonant working frequency.

This invention utilizes the idea that an elastic bar, of high mechanical efficiency, or low internal damping, sustains a large amount of strain elastic energy or potential energy at its nodal region or plane where there is substantially no mechanical vibrational motion in the direction of vibration except for some lateral vibration due to the Poisson ratio. One of the novel aspects of this invention is that, the nodal region of the vibrator which has heretofore been the area generally employed for supporting a vibrating member is herein used to perform useful work by transmitting mechanical energy to a work object.

The theory of the elastic strain principle underlying this invention will now be discussed with reference to a resonant system, or one in which each component part, namely, the stack 16, transformer 17, and transmission means 12 are as close to the same resonant frequency as possible. In the arrangement schematically represented on FIG. 1, no amplitude magnification is built into any of the three component parts, that is, the stack 16, transformer 17, or transmission means 12, so that the amplitude of vibration is substantially equal at each loop of longitudinal motion within the system.

The distance which a point on the transmission members 25 and 26 will move from its nodal position increases with the distance of this point from the center of separable output surfaces. A maximum distance that this point will travel is determined by a combination of its inherent limitations which are related to the magnetostrictive material, the strain level that can be tolerated by the stack, the dissipation of heat generated therein, and the geometry of the transducer and its associated parts.

A very important matter of concern in the construction of these vibrators used to produce sound in a medium is the efficiency of conversion of the electrical driving energy into the transmitted acoustical energy. For any vibrator, this efficiency is highest at the resonant frequency. Thus, for simple transmission means, one can choose a proper length for a desired frequency of operation, knowing the velocity of sound in the material used.

Figure 2:
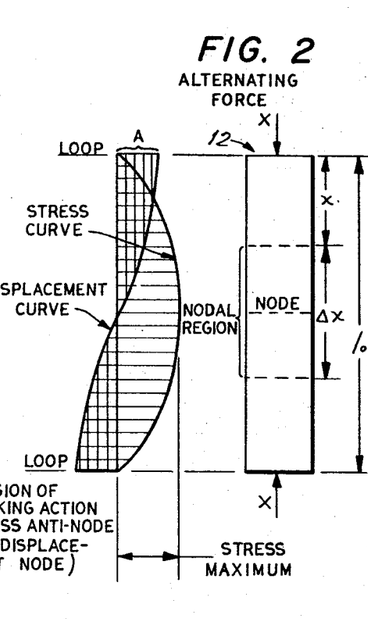
FIG. 2 is a view showing the transmission member of FIG. 1 and a graph indicating the relationship of vibration amplitude and stress concentration.

Assuming no magnification of vibration amplitude, as in FIG. 1, it can be stated that the input surfaces will vibrate at substantially an equal amplitude of vibration when the two sections 25 and 26 which are separable are joined under sufficient force so as to comprise a single system when vibrating in the presence of that force. A work object or piece is disposed between the output surfaces of the opposed members and becomes integrally associated therewith and in energy transferring relationship thereto. This idea is readily seen if we first consider simply a transmission means of a solid bar of material which is vibrating under an alternating externally applied force, whose frequency is close to the fundamental longitudinal resonance frequency of the bar. As seen in FIG. 2 a transmission means or bar 12 which in practice is separable into sections 25 and 26 along a plane in the nodal region and then recoupled under sufficient static force to act as a unitary member with all the properties associated therewith.

In order to understand the theory of the present invention, an insight into the distribution of the vibrational energy of a bar vibrator, excited into a resonant mode of vibration of substantially standing wave pattern, is needed. Whenever a bar or elastic transmission means is vibrating in some steady state pattern of vibration, there is stored up in the bar a distribution of energy arising from the elastic distortions of the material of the bar. Some of this internal stored energy is due to the actual motions of the relative parts of the bar and is in the form of kinetic energy, while there is another part which is due to displacement strains and is in the form of potential energy. There is still another component of energy, which is not actually stored in the same sense, because it is due to some form of friction internal and external and therefore appears as incoherent vibrational energy, most often simply as heat.

Figure 3:
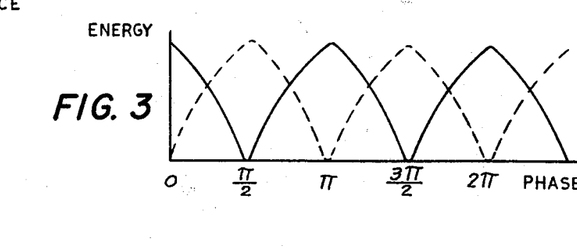
FIG. 3 is a graph showing the quantities of kinetic energy and potential energy in the system at a given time.

Now the internal kinetic and potential stored energies will vary in amount with the time, proportionately to the frequency of vibration of the bar or transmission means. Also they will be out of time phase, so that the kinetic energy will pass through its peak value just when the potential energy passes through its minimal value. FIG. 3 shows this energy fluctuation with time for a simple free bar transmission means. But, the kinetic and potential stored energies also have a spatial distribution in the bar having certain unique features.

In order to described the spatial distribution of energy in a vibrating transmission line in a steady state, we generally refer to this state as one of standing waves having spatially located nodes and loops of vibration. A node refers to a region of substantially no vibrational motion while a loop refers to a region of maximum vibrational motion. In the steady state of vibration referred to above, the nodes and loops are relatively stationary in their spatial location along the transmission line as long as the frequency of vibration is maintained, all other factors being also fairly constant. Certain amounts of loading and heating will cause some displacement of the node-loop distribution, but in most practical applications this is not of great significance.

What is fundamental to the subject invention is the fact that for such vibrating transmission lines the internal average kinetic energy concentrates in the neighborhood of loops, while the average internal potential or displacement strain energy concentrates in the neighborhood of nodes. In fact, precisely when the total internal kinetic energy is zero (strictly for unit standing wave ratio), the internal potential energy due to vibration is at its peak and is concentrated in the nodal regions of motion or simply near the nodes. Similarly, when the internal potential energy is zero, the kinetic energy is at its peak and is concentrated in the neighborhood of the loops. Again, FIG. 3 shows the time variation of the kinetic and potential energies due to vibration and as we see there, the K.E. is zero when P.E. is maximal and vice versa.

What has been described applies to all kinds of modes of elastic vibration, whether extensional radial, flexural, torsional or the like. The facts outlined are well known and may be verified by reference to any standard reference text on the elastic vibrations of solid bodies.

The relative magnitudes of quantities involved may also be appreciated by taking a simple example for, say, an extensional mode of vibration of a uniform bar. We will assume the bar is vibrating in its fundamental mode of longitudinal vibrational resonance frequency and as such has loops of motion at the ends and a node of motion at the central region. We will furthermore not consider lateral vibrations of the bar since they are secondary to our considerations, especially when the length of the bar is at least twice the diameter.

If the resonance frequency is $f$ and the speed of the elastic waves in the bar is C, then the length of the bar is given by (I)
$$l_0 = \frac{C}{2f}$$

Let the vibratory stroke at the ends or loops of the bar be S. Then we may readily indicate the values of the peak speed of the vibratory motion at the ends to be (II) $\qquad v_{max} = \pi f s$ while the peak strain in the nodal region is (III) $\qquad s_{max} = v_{max}/C$ Furthermore, the peak kinetic energy, $T_{max}$, achieved by the bar vibrations is equal to the peak potential or strain energy $V_{max}$ reached due to the vibration. This is simply a consequence of the principle of energy conservation and the fact that $T_{max}$ reaches into value when V is zero and vice versa (see FIG. 3). The value of $T_{max}$ is easily found to be (IV) $\qquad T_{max} = V_{max} = \frac{1}{4} M v_{max}^2$ where $M$ = mass of the bar.

Also, for the simple case taken here, we can readily compute the peak kinetic and potential energies reached by any section of the bar along the $x$ axis between plane, $x$, and $x + \Delta X$. Call these peak values $T_{\Delta x}$, $V_{\Delta x}$, and we get (V) $\qquad T_{\Delta x} = (2/\pi) T_{max} I_C$ $\qquad\qquad V_{\Delta x} = (2/\pi) T_{max} I_S$ where (VI)

(A) $\quad I_C = (\pi/2)[(\Delta x/l_0) + (1/2\pi)$
$\qquad\qquad (\sin [2\pi(x+\Delta x)/l_0] - \sin [2\pi x/l_0])]$ (B) $\quad I_S = (\pi/2)[(\Delta x/l_0) - (1/2\pi)$
$\qquad\qquad (\sin [2\pi(x+\Delta x)/l_0] - \sin [2\pi x/l_0])]$ Now, as we have emphasized before, these energies are also varying in time with a frequency, $f$. Also we wish to know the nature of the energy distribution on the time average. In fact, the average total energy, $E$, stored in any portion of the bar is (VII) $\quad E = (T_{max}/\pi)(I_C + I_S) = T_{max}(\Delta x/l_0)$ But this does not show us how the average kinetic and potential energies of vibration in the bar are distributed. For this purpose we want the fraction, $b_{\Delta x}$ of the average potential energy to the average kinetic energy. This is easily computed to be:

(VIII)
$$b_{\Delta x} = V_{\Delta x}/T_{\Delta x} = I_S/I_C \text{ from Eq. (V)}$$

For a nodal region we get (IX) $\quad b_{\Delta x} = (12/\pi^2)(l_0/_{\Delta x})^2$ For loop region (X) $\quad b_{\Delta x} = (\pi^2/3)(\Delta x/l_0)^2$ (X) $\quad b_{\Delta x} = (\pi^2/3) \cdot (\Delta x/l_0)^2$ Equation IX and X show what we wish to demonstrate theoreticaly.

As $\Delta x \to 0$, in Eq. IX, we are concentrating in a node and we see that $b_{\Delta x \to \infty}$, which means that at the node all the energy is potential or strain energy due to vibration. In Eq. X, as $\Delta x \to 0$, $b_{\Delta x} \to 0$, showing that at a loop the potential energy approaches zero, whereby all the energy of vibration is kinetic.

The fact that this basic effect, which is evident in this simple case, is substantially present in all the actual cases coming under this invention, is fundamental to the invention itself. The term "nodal region" as used herein is defined as a portion of a mechanically vibrating body wherein the maximum stored potential energy due to vibration exceeds the maximum stored kinetic energy due to vibration. In a preferred embodiment of this invention it is desired to work in a nodal region as herein defined, as for example in the case of the simple bar, outlined herein, wherein the P.E. is at least twice as great as the K.E.

An essential aspect of this invention is that the transmission means is designed as if it were a single solid transmitter with a plane of maximum elastic alternating strain energy occurring therein and then separating and recoupling them under a sufficient static force with the work object therebetween so that the work object is transformed into this high energy density field or nodal region to impart mechanical energy thereto.

Figure 4:
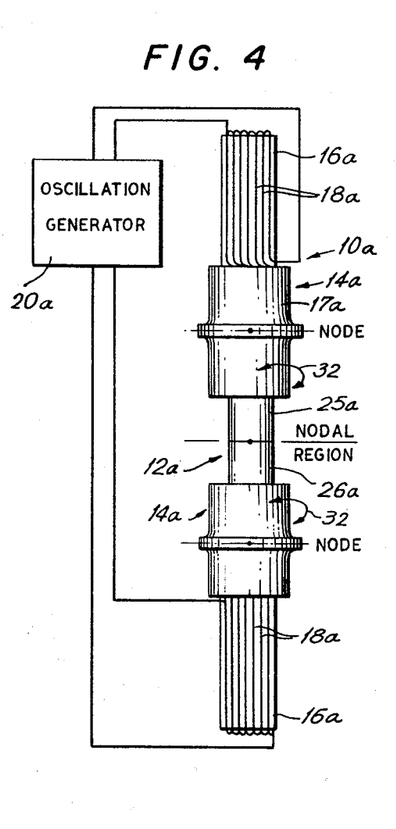
FIG. 4 is a schematic representation of a vibratory system designed to vibrate torsionally and employing a pair of transducers.

Referring now to FIG. 4, it will be seen that a vibratory system $10a$ having a pair of opposed vibrators $14a$ are employed to increase the energy level at the nodal region. These vibrators are designed to vibrate the transmission means $12a$ in a torsional mode of vibration as indicated by the double headed arrow $32$. The vibration generators $16a$ have a winding $18a$ extending in surrounding relation thereto and running lengthwise therewith and which windings are connected in series to the electrical generator $20a$. The transducer $16a$, connecting body $17a$ and transmission means $12a$ are all designed to vibrate in their torsional mode as indicated by the double headed arrow $32$, at the frequency of vbiration selected. The transmission members $25a$ and $26a$ are separable at a displacement node of torsional vibrations in a similar manner as with respect to FIG. 1. The work object must be positioned therebetween and a static force applied to establish a nodal region of vibration essentially at said work object.

Figure 5:
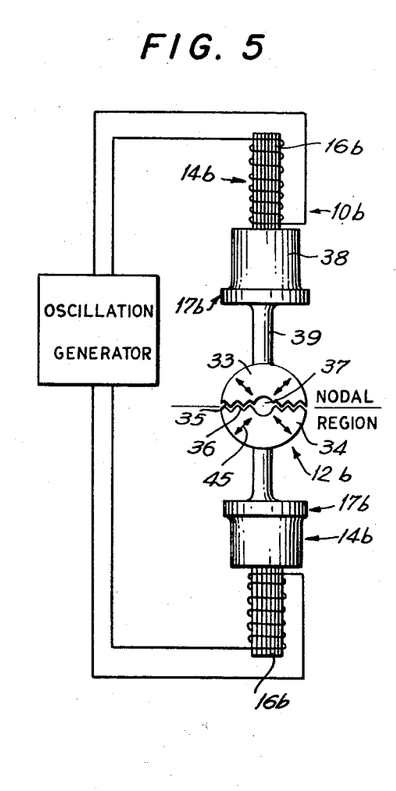
FIG. 5 is a view similar to FIG. 4, but for a vibratory system having means for increasing the amplitude of vibration and employing a radial vibrator.

FIG. 5 is another embodiment of the invention wherein the vibratory system $10b$ has transmission means $12b$ designated to vibrate in a radial mode of vibration. A pair of longitudinal transducers $14b$ comprised of a stack $16b$ and a connecting body $17b$ are each connected to separable transmission members $33$ and $34$ which are designed to vibrate in a radial mode as indicated by the double headed arrows $45$. The output surfaces of the transmission members $33$ and $34$, respectively, are preferably provided with means for interlocking the opposing surfaces along their separation lines so as to assure a proper coupling therebetween when the static force is applied. Interlocking teeth $35$ and $36$ are provided on transmission members $33$ and $34$ respectively, to prevent a slippage between the respective output surfaces. Work receiving aperture $37$ is provided and may extend generally through the members $33$ and $34$ for receiving a workpiece situated therein. The transmission means $12b$ is designed to have a radial resonance at the longitudinal frequency of the transducers $14b$ and may be in the form of a disc or sphere with the aperture extending therethrough or in the form of a closed pocket therein.

The connecting body $17b$ may be designed as an acoustical impedance transformer having a certain magnification ratio and wherein the input section $38$ has a relatively larger thickness and mass, and an output section $39$ is thinner than the input section and of a lower mass, as descrbied in United States Letters No. Re. 25,033, issued Aug. 21, 1961, to Lewis Balamuth and Arthur Kuris, for "Vibratory Machine Tool and Vibratory Abrasion Method," and assigned to the present assignee. The mass differential between the input and output section of the vibrating connecting body increases the amplitude of the vibration appearing at the outer surface which is coupled to the transmission members.

Figure 6:
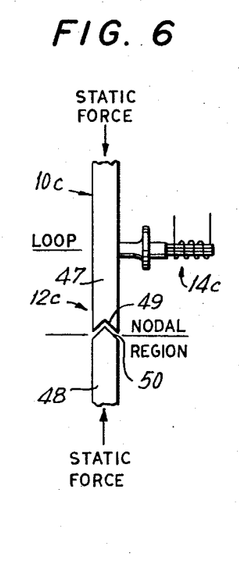
FIG. 6 is a schematic representation of a vibratory system designed to vibrate in a flexural mode of vibration.

The nodal region of vibration may also be essentially at a displacement node in a flexurally vibrating system as seen in FIG. 6, wherein the vibratory system $10c$ contains a transducer $14c$ coupled to transmission means $12c$, the latter comprised of a pair of matched transmission members $47$ and $48$ designed to vibrate in a flexural mode when excited by the transducer $14c$ coupled to transmission member $47$. The transmission means $12c$ is separable at the juncture of the transmission means $47$ and $48$ and having output surfaces $49$ and $50$, respectively. The region of separation being essentially at a nodal region of flexural vibrations and the surfaces contoured to permit a firm grip on the work object to be positioned therebetween.

The static force may be applied through the transmission members and of a sufficient magnitude to couple the transmission members with the work in order to have the strain elastic energy applied thereto.

Figure 7:
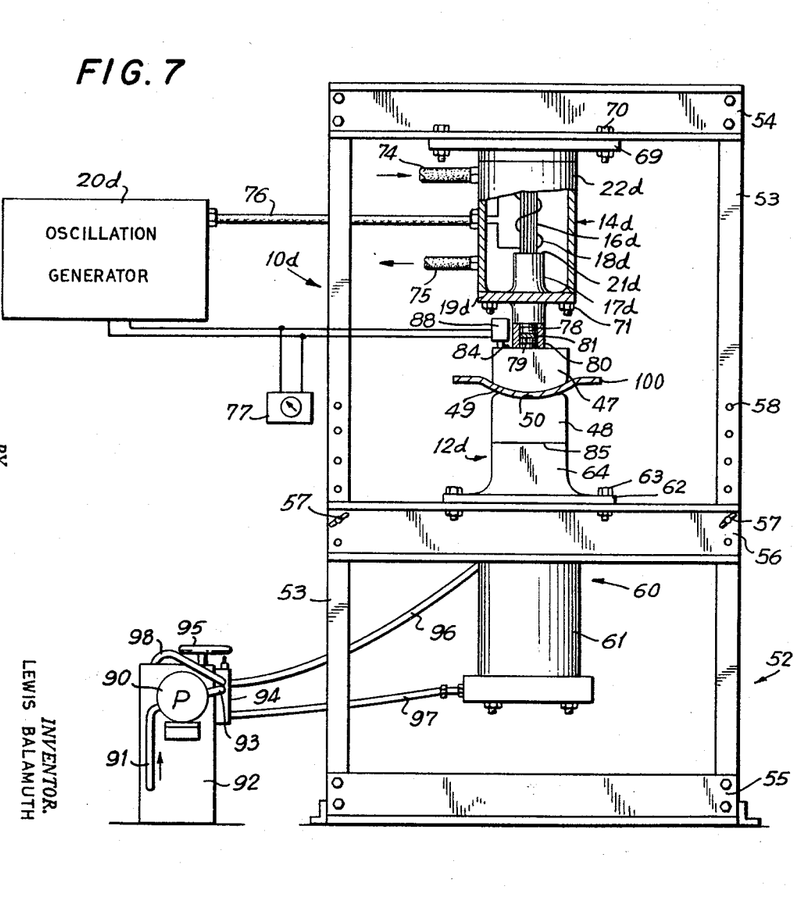
FIG. 7 is a front elevational view, partly schematic and partly broken away and in section of apparatus embodying the present invention for use in a metal forming operation.
Figure 8:
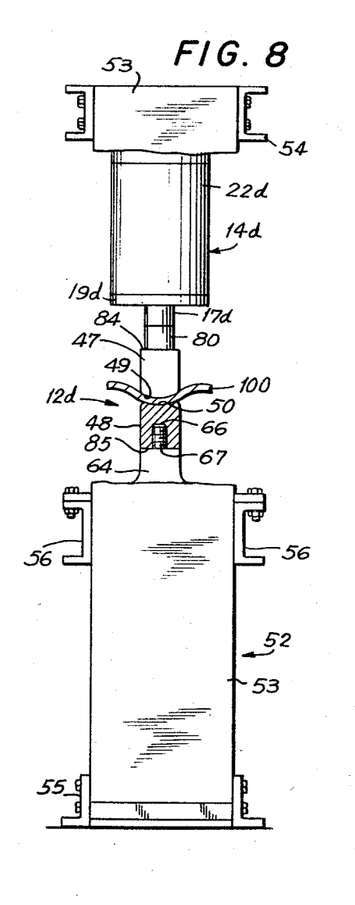
FIG. 8 is a side elevational view; partly broken away and in section, of the apparatus of FIG. 7.

Referring now to FIGS. 7 and 8, it will be seen that the apparatus as there illustrated for metalworking is generally as shown in United States Letters Patent No. 3,201,967, issued Aug. 25, 1965, to Balamuth et al. for "Metal Forming," and, assigned to the present assignee, except that the novel concept of placing the work object at a displacement nodal region of vibration is not considered. For the purpose of the explanation of the FIGS. 7 and 8, it will be assumed that the apparatus is working with work objects of metallic sheet materials that are to be formed and are at rest when being formed.

In the apparatus $10d$ illustrated in FIGS. 7 and 8, the transmission means $12d$ is comprised of an upper transmission member or tool $47$, having a contoured output or contacting surface $49$ and lower transmission member or tool $48$, having a complementary contoured output or contacting surface $50$, which are supported within a frame $52$ that includes parallel uprights $53$ and top and bottom cross members $54$ and $55$ suitably secured to the opposite ends of the uprights. Intermediate cross members $56$ are secured, at their ends, to the uprights $53$ at adjustably selected locations, for example, by pins $57$ extending through openings in cross members $56$ and through a series of openings $58$ formed in each of the uprights.

Force applying means $60$ may consist of an hydraulic cylinder $61$ which depends vertically between intermediate cross members $56$ and has a mounting plate $62$ at its upper end which is secured, as by bolts $63$, to the cross members 56, and a vertically movable ram 64 projects upwardly from cylinder 61 through a suitable opening in the mounting plate 62. The transmission member 48 is rigidly attached to the ram 64 having a downwardly opening tapped bore or socket 66 for receiving a threaded extension 67 of the ram 64 (FIG. 8) so that the transmission member 48 can be securely attached to the ram for movement with the latter.

The transmission member 47 is supported vertically above transmission member 48 and in substantial axial alignment therewith by the vibratory unit 14d, as previously described, and having the enclosure or casing 22d depending from a mounting plate 69 secured, as by bolts 70, to the top cross members 54. The flange 19d of connecting body 17d is secured by bolts 71 to the casing 22d, and inlet and outlet hoses 74 and 75 are connected to the casing for circulating a cooling fluid, preferably water, through the casing so as to remove heat generated in the stack 16d during operation of the transducer.

In the apparatus 10d of FIGS. 7 and 8, the frequency of the biased alternating current supplied through conductors in a cable 76 from generator 20d to winding 18d is adjusted by means of a magnetostrictive pick-up 88 mounted on tool 47 and providing a signal or output varying with the amplitude and frequency of the vibrations and being fed back to the generator as well as actuating an amplitude meter 77. Other existing types of oscillation generators may also be employed, for example, as disclosed in U.S. Patent No. 2,872,578, in which adjustment of the frequency of the alternating current supplied by the oscillation generator is obtained through the use of a feedback signal which varies with the impedance of the transducer.

The lower or output end of connecting body of transformer 17d is preferably provided with a depending threaded projection 78 which is coupled to a similar threaded projection 79 at the upper end of the tool or vibration transmitting member 47 by means of an internally threaded coupling sleeve or nut 80. A thin disk 81 of copper or other deformable metal is preferably interposed between the smooth flat end surfaces of the projections 78 and 79 so that, when sleeve or nut 80 draws projections 78 and 79 axially toward each other, disk 81 ensures uninterrupted metallic contact between transformer 17d and tool or vibration transmitting member 47 over the substantial cross sectional area of projections 78 and 79, whereby, the transmission of vibrations from transformer 17d to tool 47 is enhanced.

For performing a metal working operation the work object 100 is interposed between the separable transmission members and while the transmission member 47 of the apparatus 10d is held stationary and has acoustical or ultrasonic vibratory energy imparted thereto by the transmission of a wave motion through the transformer 14d, the lower or opposite transmission member 48 is movable vertically toward and away from tool 47 by controlling the supplying of hydraulic fluid under pressure to the cylinder 61. As shown schematically in FIG. 7, the supplying of hydraulic fluid under pressure to cylinder 61 may be effected by an arrangement including a pump 90 having an inlet conduit 91 drawing hydraulic fluid from a supply tank 92 and an outlet conduit 93 extending from the pump to a distributor valve 94 which is suitably operated, for example, by a handle 95. The valve 94 is selectively operative to direct the fluid under pressure to one or the other of two flexible conduits 96 and 97 connected to the opposite ends of cylinder 61, while the other of such flexible conduits is placed in communication with a return pipe 98 extending from distributor valve 94 back to tank 92. Thus, in one position of the distributor valve 94, hydraulic fluid under pressure is supplied through conduit 96, to the upper end of cylinder 61 to move ram 64 downwardly, and thereby space transmission member 48 from transmission member 47 so that the work object 100 to be formed can be inserted between the transmission members or so that the work object can be removed. In the other position of valve 94, flexible conduit 96 is connected to the return pipe 98, while conduit 97 is connected to the outlet 93 of pump 90 and conveys hydraulic fluid under pressure to the lower end of cylinder 61 for urging the supported transmission member 48 upwardly toward the cooperating transmission member 47 which is simultaneously vibrated, as previously indicated, so that the work object 100 disposed between the member 47 and member 48 will be essentially at a node of motion and formed or shaped by the combined action of the static force from the hydraulic fluid imparted to the work object and mechanical energy transferred thereto. The transmission members 47 and 48 are designed so that the distance between their respective spaced input surfaces 84 and 85 is of a length substantially equal to an integral number of half-wavelengths or an odd integral number of one quarter-wavelength at the frequency of vibrations coupled thereto. This variation will depend on the mounting arrangement used. But, irrespective of the total length of the transmission members when they are coupled to the work object a nodal region of vibration is established essentially at the location of the work object 100 so that its configuration is altered by the combined action of the static force and the transfer of the mechanical energy thereto.

Figure 9:
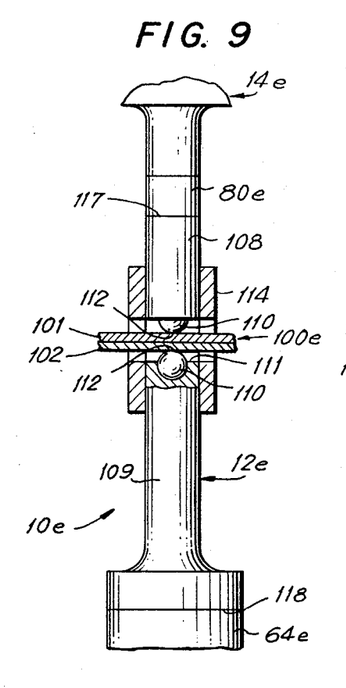
FIG. 9 is a front fragmentary view similar to a portion of FIG. 7, but showing a modification of the transmission members for use in a welding operation.
Figure 10:
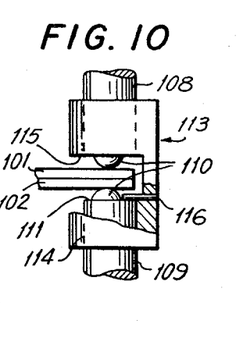
FIG. 10 is a side fragmentary view of FIG. 9, partly broken away and in section.

In another embodiment of this invention 10e illustrated in FIGS. 9 and 10, the strain energy principle is utilized in a welding process wherein the work object 100e consists of overlapping layers of material such as an upper sheet metal member 101 and lower sheet metal member 102. Although the material is illustrated as metallic, it will be realized that the overlapped sheets to be joined may be of any combination of joinable materials, such as thermoplastic material or materials. However, for the purpose of the explanation of FIGS. 9 and 10, it will be assumed that the apparatus is working with metallic sheet materials that are to be joined and that are at rest when being joined together.

In the apparatus 10e the work object 100e is placed between separable transmission means 12e comprised of vertically supported transmission members 108 and 109 in axial alignment with each other. The transmission member 108 may be of a length essentially equal to an integral odd number of one quarter wavelengths, for example one, at a predetermined frequency and the transmission member 109 of a length essentially equal to an integral number of quarter wavelengths, for example two, at said frequency in a manner to establish a nodal region of vibration along the axis of the transmission members at or near the interface of the overlapped sheet. The transmission member 108 is coupled at its upper end or input surface 117 to transducer 14c by means of nut 80e as previously explained.

The output ends or surfaces 112 of the transmission members 108 and 109 are formed of spherically shaped contacting members 110 that are rigidly joined as by welding or some other means to the transmission members. This design offers a minimum area of contact between the metal sheets 101 and 102 with the contacting tips 110. The area of contact will depend on the size of the spot weld required as well as the thickness, composition and power available, etc.

The lower transmission member 109 is coupled at its lower end or input surface 118 to the hydraulic system via ram 64e as explained with reference to FIGS. 8 and 9 and wherein a static force may be applied moving the transmission members toward each other with a predetermined static force so that a proper coupling between the sheets 101 and 102 with the transmission members is obtained and the mechanical energy coupled thereto.

To control the alignment of the transmission members 108 and 109 guide means 113 consisting of a cylindrical sleeve 114 having a horizontal slot 115 of a width sufficient to facilitate the positioning of the work object 100e therein. A support pin 116 extends through the wall of the sleeve 114 and rests on the upper surface 111 of transmission member 109, in this manner the transmission members are maintained in axial alignment during the welding cycle.

Each weld may be performed by first positioning the area of the overlapped sheets 101 and 102 within the slot 115 in substantially the arrangement illustrated in FIGS. 9 and 10 and then the static force is applied to couple the work object 100e and transmission members together. The vibratory energy is transmitted to the upper transmission member 108, although it is contemplated that when desired, both of the transmission members may be made to vibrate, and a nodal region is established at the work site.

Figure 11:
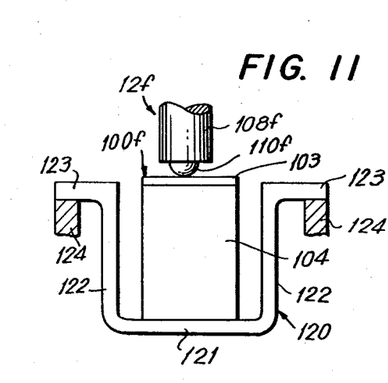
FIG. 11 is another fragmentary elevational view similar to FIG. 9 but showing a modification of the work object and work support.

In the above described embodiments of the invention the transmission means consisted of separable members designed to be vibrated at a nodal region at a defined frequency. However, for certain applications the work object itself may be so dimensioned wherein it may also act as a transmission member, as for example in the case when it is of a length essentially equal to an integral number of one quarter wavelengths in the defined frequency of vibration. In other applications the work object may be of a sufficiently large mass so that again a second or complementary transmission member may be dispensed with. In either case a suitable supporting means may be provided. In the arrangement of FIG. 11, the transmission means 12f consists of a single transmission member 108f, which is placed in energy transmission relationship with a work object 100f wherein the latter is of a length so that nodal region may be obtained without the utilization of a separable transmission member as previously disclosed. Or, if we wish to look at it another way, we might state that the work object serves a dual purpose as both a work object and transmission member. The work object 100f consists of a sheet of material 103 which may be of a thermo-softening material, for example, plastic that is to be joined to a rigid block of another thermo-softening material 104. The block 104 may be freely supported on support means 120 which may be designed as a resonant one quarter loop support having a base 121, on which the block 104 rests, and side walls 122 terminating in an upper flange 123. The length of the support 120 is substantially equal to a quarter wavelength at the frequency of vibration at which the transmission member is vibrated.

Supports 124 are provided and may be coupled to the hydraulic drive means of FIGS. 7 and 8 or fixed in position with the transducer coupled to the transmission member 108f and moved vertically by hand to apply the static force. To obtain the desired joining of the materials the interface of the two members to be joined should be located essentially at the nodal region.

Figure 12:
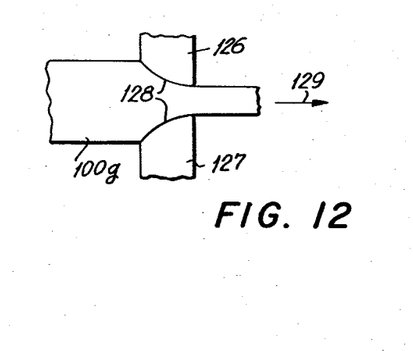
FIG. 12 is another fragmentary elevational view, but showing another embodiment of the invention, wherein two transmission members are used for a metal extruding operation with the work object at a node of vibration.

FIG. 12 illustrates another embodiment of the invention for use in an extrusion process wherein the work object 100g is being processed through a pair of relatively fixed transmission members 126 and 127 which are provided with contoured output surfaces 128. The work object 100g being moved in a direction substantially normal to the direction of static force being applied. The vibratory system is designed so that the work object 100g moving in the direction of arrow 129 has its cross section altered by the static force applied through the transmission members and the softening effect of the mechanical energy imparted to the work in the nodal region.

From the above, it will be apparent that the physical length of the nodal region effective to obtain desirable results will vary with the particular application. For a given system on which the work object is longer than the effective nodal region at a predetermined frequency, the transducer may be modulated in a selected frequency range whereby the total length of the work object is effectively made a nodal region with the work object itself fluctuating between being a nodal region and transmission member until the process is completed. As such an essential feature of the present invention is that the work object either in its entirety or portions thereof are effectively made into a nodal region of vibration and while in that state a work performing operation is performed thereon.

In the applications of the subject invention so far discussed, the vibration transmission means have generally been considered to be of a substantially uniform cross-section. When the cross-section is not dependent on the distance measured along its axis, then it is in general true, that, for resonant standing wave conditions the zero displacement region (displacement node), the peak average strain coincides with this displacement node.

But when the cross-section of the transmission member is variable and is some function of the distance along its axis, then the displacement node and the peak strain will not in general coincide. For example, in the case where the transmission means is in the form of an exponentially tapered cone and the vibrations are in the form of compressional waves, the displacement node will be shifted from the corresponding position for a uniform bar back towards the larger cross-sectional end, while the peak strain will be shifted toward the smaller end of the cone. Thus, to practice the subject invention for this case, it is adequate to select the region generally between the peak strain and the displacement node as the place for operating on the work. This comment is made to show that it is appreciated that the concept of nodal region as herein employed may readily cover variable as well as constant cross-section transmission members.

The above described embodiments of the invention have referred to the work object as being of a single layer of material or a pair of overlapping layers but it is to be noted that the invention may be similarly applied to multiple layers of materials. Additionally, the work object may be of a material such as metal, plastic, glass, etc. or any combinations thereof without departing from the scope of the present invention.

Although a number of embodiments and applications of the present invention have been described in detail herein with reference to the accompanying drawings, it is to be understood that this invention is not limited to those precise embodiments and applications, and that various changes and modifications may be effected therein, by one skilled in the art, without departing from scope or spirit of the invention, except as defined in the appended claims.

What is claimed is:

1. A device for applying mechanical energy to a work object, the combination comprising
    (A) means for generating high frequency mechanical vibrations of a predetermined vibration mode,
    (B) transmission means,
    (C) means for transmitting said variations through said transmission means, and
    (D) means for placing the work object against said transmission means under a sufficient static force to establish a nodal region essentially at the location of said work object, whereby mechanical energy is transmitted thereto.

2. A device for applying mechanical energy to a work object, the combination comprising
    (A) energy transmission means provided with an output surface for engagement with the work object, and
    (B) means for effecting vibration of said energy transmission means at a fundamental vibration mode of the latter,
    (C) said transmission means having a length equal to substantially an odd number of one quarter-wavelengths at the fundamental vibration mode so that a node of vibration appears substantially at said output surface of the transmission means when in engagement with a work object for the transmission of mechanical energy thereto.

3. A device for applying mechanical energy to a work object, the combination as in claim 2;
   further comprising means for pressing the output surface of said transmission means against the work object.

4. A device for applying mechanical energy to a work object, the combination as in claim 3;
   further comprising means for supporting the work object in energy transferring relationship with the energy transmission means.

5. A device for applying mechanical energy to a work object, the combination as in claim 4;
   wherein said means for supporting the work object includes a support member having a surface for engagement with said work object, said support member being of a length so that a loop of vibration is present substantially at said surface of the support member when in engagement with the work object.

6. A device for applying mechanical energy to work object, the combination comprising
   (A) electromechanical transducer means for converting electrical energy into elastic vibrations and adapted to vibrate at a defined resonant frequency under a loaded condition,
   (B) energy transmission means provided with an output surface for engagement with the work object, and
   (C) means coupling said energy transmission means to said transducer means for delivery of the elastic vibrations thereto, and
   (D) means for exerting a static force compressing the output surface of said transmission means against said work object so that a proper coupling therebetween is obtained under a loaded condition,
   (E) said energy transmission means being resonant under the loaded condition at said defined resonant frequency whereby a nodal region of vibration exists at said output surface to effect optimum transfer of mechanical energy to the work object.

7. A device for applying mechanical energy to a work object, the combination as in claim 6;
   further comprising power supply means for generating said electrical energy.

8. A device for applying mechanical energy to a work object, the combination comprising
   (A) a pair of separable transmission members,
   (B) means for disposing the work object between said transmission members,
   (C) means for creating a predetermined static force between said work object and transmission members, and
   (D) means for simultaneously applying vibrations to at least one of said transmission members at a frequency related to the transmission members and work object to establish a nodal region of vibration substantially at said work object, whereby mechanical energy is transmitted thereto.

9. A device for applying mechanical energy to a work object, as in claim 8;
   wherein said separable transmission members are movable forward and away from each other in a given direction.

10. A device for applying mechanical energy to a work object, as in claim 8;
    wherein said high frequency vibrations are applied in directions parallel to the direction in which said transmission members are relatively movable.

11. A device for applying mechanical energy to a work object, as in claim 8;
    wherein said high frequency vibrations are longitudinal in direction.

12. A device for applying mechanical energy to a work object, as in claim 8;
    wherein the vibrated transmission member has a length substantially equal to an odd integral number of one quarter wavelengths at the frequency of vibration.

13. A device for applying mechanical energy to a work object, as in claim 8;
    wherein said transmission members are in axial alignment with each other, and
    further including means for maintaining said transmission members in axial alignment with respect to each other when they are placed in energy transferring relationship to the work object.

14. A device for applying mechanical energy to a work object, the combination comprising
    (A) energy transmission means having spaced input surfaces and being separable at a plane therebetween to define output surfaces adapted to engage opposite sides of the work object, the distance between said input surfaces being of a length with at least one nodal plane therebetween, said transmission means being separable substantially at said nodal plane,
    (B) vibrating generating means coupled to said energy transmission means along at least one of said input surfaces, to introduce high frequency acoustical waves in said energy transmission means, and
    (C) means for exerting a static force compressing the output surfaces of said transmission means against said work object so that a proper coupling therebetween is obtained, whereby mechanical energy is transmitted to the work object positioned therebetween.

References Cited

UNITED STATES PATENTS

| | | | |
|---|---|---|---|
| 2,946,119 | 7/1960 | Jones | 29—470 |
| 2,834,158 | 5/1958 | Petermann | 51—57 |
| 3,029,666 | 4/1962 | Lovins | 228—1 |
| 3,017,792 | 1/1962 | Elmore | 228—1 |
| 3,184,353 | 5/1965 | Balamuth | 156—73 |
| 2,393,131 | 1/1946 | Vang | 113—46 |

RICHARD H. EANES, Jr., *Primary Examiner.*